United States Patent
Ludlow

(10) Patent No.: US 7,950,687 B2
(45) Date of Patent: May 31, 2011

(54) WHEELBARROW WITH IMPROVED STABILITY

(76) Inventor: Loren Ludlow, Riverton, UT (US)

(*) Notice: Subject to any disclaimer, the term of this patent is extended or adjusted under 35 U.S.C. 154(b) by 233 days.

(21) Appl. No.: 12/354,731

(22) Filed: Jan. 15, 2009

(65) Prior Publication Data

US 2009/0179393 A1 Jul. 16, 2009

Related U.S. Application Data

(60) Provisional application No. 61/021,313, filed on Jan. 15, 2008, provisional application No. 61/027,403, filed on Feb. 8, 2008.

(51) Int. Cl.
*B62B 1/18* (2006.01)
*B62B 5/04* (2006.01)
*B62B 3/00* (2006.01)
*B62D 61/12* (2006.01)

(52) U.S. Cl. ............ 280/653; 280/654; 280/43.11; 280/47.17; 280/47.2; 280/47.23; 280/47.26; 280/47.31; 280/79.2

(58) Field of Classification Search .......... 280/651, 280/652, 653, 654, 43.1, 43.11, 47.131, 47.17, 280/47.16, 47.2, 47.23, 47.26, 47.3, 47.31, 280/79.2
See application file for complete search history.

(56) References Cited

U.S. PATENT DOCUMENTS

| | | | |
|---|---|---|---|
| 362,868 A * | 5/1887 | Roberts | 280/47.24 |
| 638,106 A * | 11/1899 | Freed | 280/47.23 |
| 752,725 A * | 2/1904 | Tieman | 280/47.23 |
| 817,677 A * | 4/1906 | Smith | 280/47.23 |
| D163,280 S | 5/1951 | Harrison | |
| 2,571,595 A * | 10/1951 | McLeary | 280/47.23 |
| 2,660,446 A | 11/1953 | Edhardt | |
| 2,707,351 A | 5/1955 | Walker | |
| 3,064,990 A * | 11/1962 | Salvucci | 280/47.2 |
| 3,552,760 A | 1/1971 | Sine | |
| 3,647,236 A * | 3/1972 | Hayes | 280/641 |
| 4,061,349 A * | 12/1977 | Stahl | 280/47.2 |
| 4,471,996 A | 9/1984 | Primeau | |
| 4,758,010 A | 7/1988 | Christie | |
| 5,088,751 A | 2/1992 | Zint | |
| 5,222,757 A * | 6/1993 | Magyar | 280/653 |
| 5,472,220 A | 12/1995 | Stephan | |
| 5,884,924 A | 3/1999 | Fairchild et al. | |
| 6,148,963 A * | 11/2000 | Canfield, Jr. | 188/24.21 |
| 6,209,891 B1 | 4/2001 | Herrmann | |
| 6,315,310 B1 | 11/2001 | Hurt | |
| 6,415,880 B1 * | 7/2002 | Strothmann | 180/19.3 |
| 6,419,246 B1 | 7/2002 | Neal | |
| 6,488,293 B1 | 12/2002 | Mitchell et al. | |
| 6,764,093 B2 | 7/2004 | Allsop et al. | |
| D501,974 S | 2/2005 | Lawson et al. | |
| 6,902,184 B2 * | 6/2005 | Hsu | 280/653 |
| D589,852 S | 4/2009 | Giampavolo | |
| 7,549,648 B2 * | 6/2009 | Girard et al. | 280/1.5 |
| 7,575,241 B1 * | 8/2009 | Keller | 280/32.5 |
| 2003/0097772 A1 * | 5/2003 | Christensen | 37/304 |
| 2004/0041361 A1 | 3/2004 | Lim | |
| 2005/0275176 A1 | 12/2005 | Jessop | |
| 2007/0158922 A1 * | 7/2007 | Mullen et al. | 280/47.31 |

* cited by examiner

*Primary Examiner* — Hau V Phan
*Assistant Examiner* — John R Olszewski
(74) *Attorney, Agent, or Firm* — Bateman IP Law Group

(57) ABSTRACT

An improved wheelbarrow places the bucket at ground level when at rest. The wheelbarrow frame beneath the bucket rests on the ground while the wheelbarrow is at rest. The wheelbarrow wheel is lifted off of the ground at rest. The wheelbarrow provides greatly improved stability both at rest and while moving the wheelbarrow.

21 Claims, 6 Drawing Sheets

US 7,950,687 B2

WHEELBARROW WITH IMPROVED STABILITY

RELATED APPLICATIONS

The present application claims the benefit of U.S. Provisional Application Ser. No. 61/021,313, filed Jan. 15, 2008. The present application also claims the benefit of U.S. Provisional Application Ser. No. 61/027,403, filed Feb. 8, 2008.

BACKGROUND OF THE INVENTION

1. The Field of the Invention

The present invention relates to wheelbarrows. More specifically, the present invention relates to a wheelbarrow with improved stability and resistance to tipping over.

2. State of the Art

Wheelbarrows are commonly used. Many persons such as homeowners or construction workers use wheelbarrows for moving dirt, rocks, concrete, and many other materials. Wheelbarrows are often used while constructing a building, installing or maintaining landscaping, gardening, general yard work, etc. Wheelbarrows increase the ease, efficiency, and speed of performing these tasks by providing mechanical advantage in lifting and moving a load and by providing a greatly increased capacity to move a load over other methods such as carrying by hand or bucket. A significant number of the households across the U.S. own wheelbarrows.

Existing wheelbarrows, while useful, suffer from several flaws which impair their ease of use. Existing wheelbarrows are difficult to maneuver over objects due to the bar which crosses in front of the wheel. Existing wheelbarrows also become increasingly unstable with increasing load, causing the wheelbarrow to tip over if the user does not maintain the handles level while transporting a load. Existing wheelbarrows also keep the bucket high off of the ground, requiring a person to lift objects a fair height in order to fill the wheelbarrow and increasing the likelihood that the wheelbarrow tips over while filling.

There is thus a need for a wheelbarrow which overcomes these limitations. There is a need for a wheelbarrow which is more stable and less likely to tip during use.

SUMMARY OF THE INVENTION

It is an object of the present invention to provide an improved wheelbarrow.

According to one aspect of the invention, a wheelbarrow is provided which does not have legs beneath the bucket, placing the frame directly on the ground when not moving the wheelbarrow. The bucket is thus placed low to the ground while filling and using the wheelbarrow.

According to another aspect of the invention, a wheelbarrow is provided which does not have a bar in front of the wheel. The wheelbarrow thus may maneuver over larger objects such as curbs and is less likely to become stuck while moving the wheelbarrow.

According to another aspect of the invention, a wheelbarrow is provided which uses the frame to brace the bucket, making the wheelbarrow stronger and more resistant to failure.

These and other aspects of the present invention are realized in a wheelbarrow as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
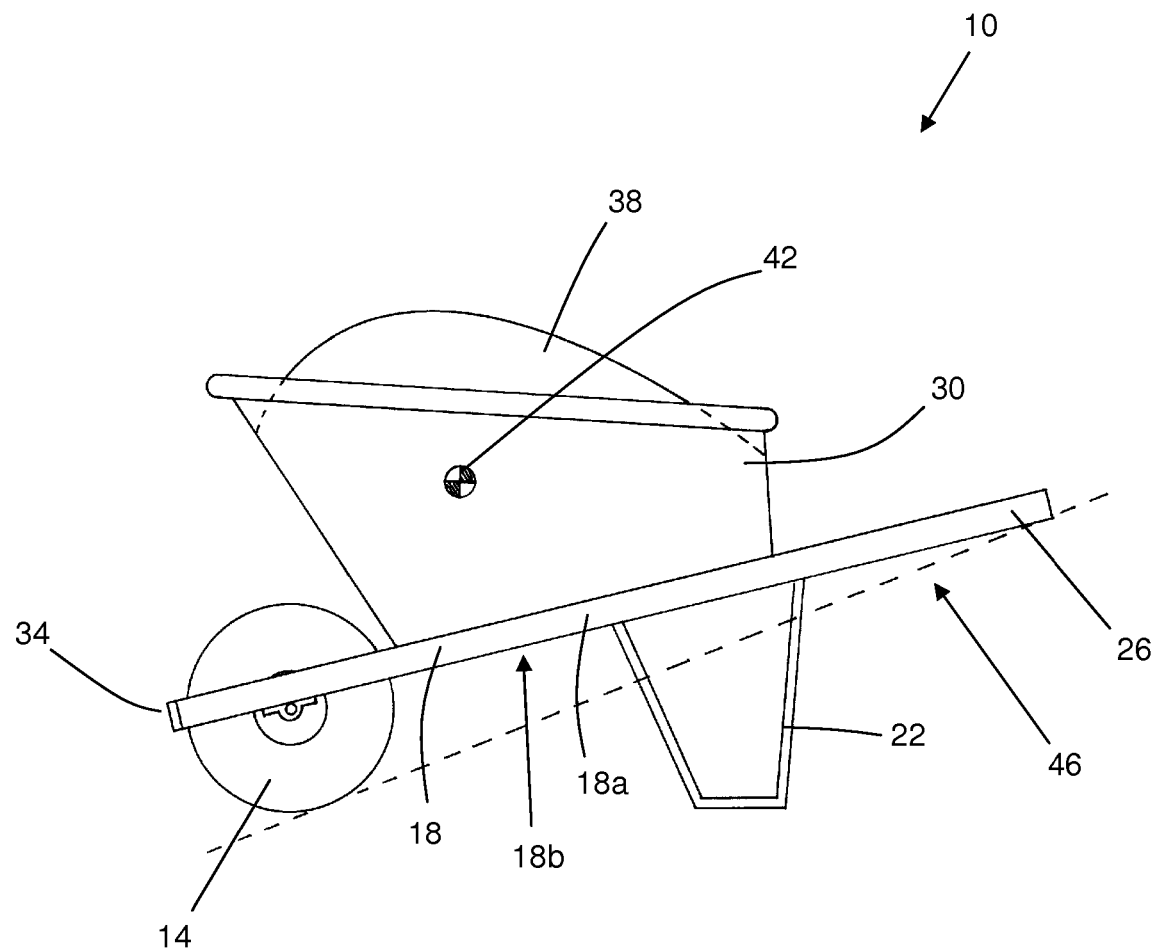
FIG. 1 shows a side view of a wheelbarrow known in the art.

Turning now to FIG. 1, a side view of a prior art wheelbarrow 10 is shown. The wheelbarrow includes a wheel 14, frame 18, legs 22, handles 26, and a bucket 30. The frame 18 includes two side pieces 18a, 18b disposed on either side of the wheel 14. The frame side pieces 18a, 18b are closer together at the wheel 14 and farther apart at the rear so as to provide integral handles 26. The frame side pieces 18a, 18b are connected in front of the wheel with a cross bar 34 in order to strengthen the frame 18 and to provide a non-rotating point on the front of the wheelbarrow to aid in dumping a load 38 which is being carried. The bucket 30 is supported on top of the frame 18 and legs 22 are attached to the frame to place the handles at a usable height and to support the weight of the bucket.

One problem with the wheelbarrow 10 is that the cross bar 34 limits the height of objects which the wheel 14 can roll over. Typically, objects which are less than three inches in height are rolled over without hitting the cross bar 34. Many objects such as curbs are taller, however, and not easily traversed by the wheelbarrow. When using such a wheelbarrow 10, it is common to hit the cross bar 34 on rocks or dirt which is on the ground, often causing the user to hit their legs against a brace placed between the legs 22 or to lose control of the wheelbarrow and spill the contents thereof.

Another problem with the wheelbarrow 10 is that the center of gravity 42 of the loaded wheelbarrow is high off of the ground and well above the legs 22, handles 26, and bottom of the wheel, the points which support the wheelbarrow while loading or carrying the same. If an imaginary line 46 is drawn between the base of the wheel 14 and the handles 26, it can be seen that the center of gravity 42 is well above that line, making the wheelbarrow 10 unstable. The more weight that is placed in the wheelbarrow 10, the more difficult it is to maintain control over the wheelbarrow. The user, however, desires to maximize the weight carried in each load in order to reduce the number of loads necessary and complete the job faster.

The instability inherent in the wheelbarrow 10 caused by the elevated load makes it easy to tip the wheelbarrow 10 over while loading or moving the wheelbarrow. If a person is loading dirt or the like into a wheelbarrow 10 with a shovel the dirt typically lands in the bucket 30 with significant sideways momentum and may often tip the wheelbarrow over, especially if the wheelbarrow is not on flat and level ground. If a person transporting the wheelbarrow lets a handle 26 droop or otherwise causes the load to become un-level, the high center of gravity 42 urges the wheelbarrow to tip over, making it difficult to regain control over the wheelbarrow.

It is likely that most individuals who have used a wheelbarrow 10 have tipped one over and spilled the load. In some situations, tipping a wheelbarrow 10 over simply causes additional work for the operator. In other situations such as where a person is carrying concrete, tipping the wheelbarrow may ruin a driveway, building, or landscaping by spilling concrete on the same. If the person is carrying trees or other objects, the object may be damaged by the fall.

Figure 2:
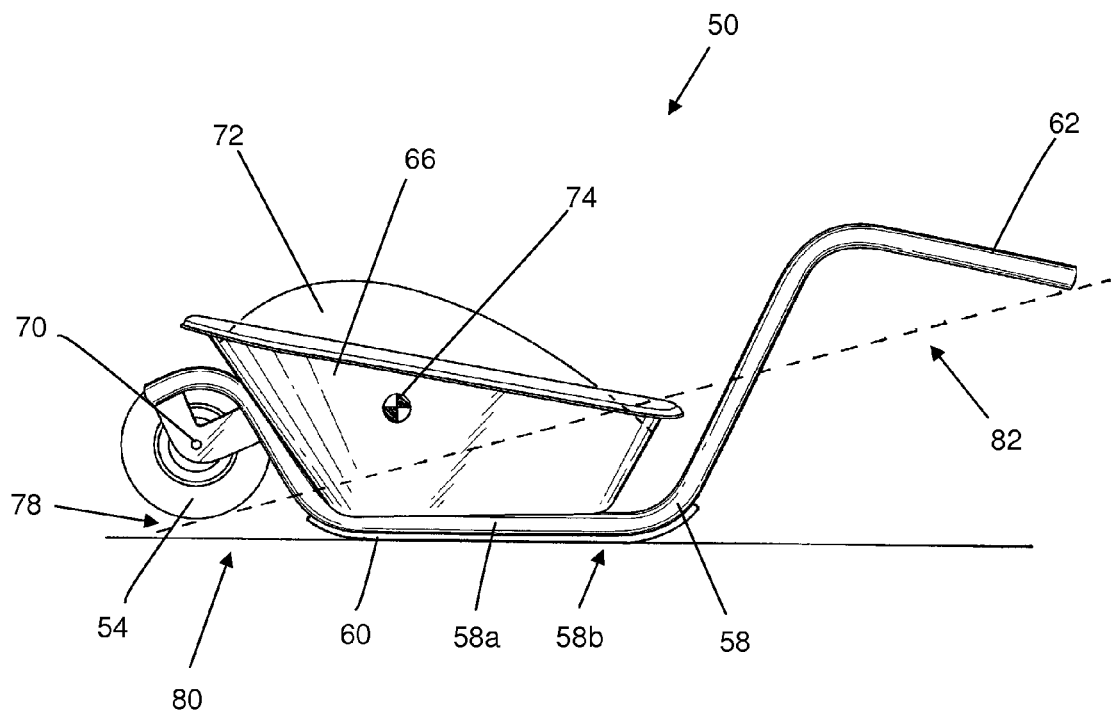
FIG. 2 shows a side view of a wheelbarrow of the present invention.

Turning now to FIG. 2, a side view of a wheelbarrow 50 of the present invention is shown. The wheelbarrow 50 includes a wheel 54, a frame 58, handles 62, and a bucket 66. The handles 62 are typically integral to the frame 58. The frame 58 typically includes two sides 58a and 58b. For convenience in transporting new wheelbarrows 50, the frame sides 58a, 58b may be made in two pieces with a joint which is connected together before use, but eliminating the joint typically results in a stronger frame. The frame sides 58a, 58b typically are closer together near the wheel 54 and farther apart near the handles 62. The frame 58 may have a steel plate, cross bars, or other structure which spans between the frame sides 58a, 58b and supports the bucket 66 or strengthens the frame 58. The frame 58 may have plastic skid plates 60 placed across the bottom of the frame as shown.

The wheelbarrow 50 is unique in that there are no legs beneath the frame 58. While not moving or lifting the wheelbarrow 50, the frame 58 rests on the ground. When the frame 58 is resting on the ground, the wheel 54 is lifted off of the ground a small distance such as 0.5 inch, as indicated at 78. This configuration places the bucket 66 and load 72 nearly at ground level while the wheelbarrow is resting. The low positioning of the bucket 66 provides several benefits.

First, a user does not need to lift objects very high in order to place these into the bucket 66, reducing the work necessary to fill the wheelbarrow. This also reduces the strain on the user's back. Secondly, there is almost no risk that the wheelbarrow 50 will tip over during filling even if the load 72 is thrown sideways into the wheelbarrow. The center of gravity 74 of the loaded wheelbarrow 50 remains low even with a full load. Because the wheel 54 is off of the ground 80 while the wheelbarrow 50 is at rest, as indicated at 78, the wheelbarrow does not slide around or roll forwards while filling the bucket 66, as can happen with prior art wheelbarrows.

When a user is lifting the handles 62 to move the load 72, the center of gravity 74 remains low. If an imaginary line 82 is drawn between the bottom of the wheel 54 and the handles 62, it can be seen how the center of gravity 74 is not very high above the line and is nearer to the ground, making the wheelbarrow 50 significantly more stable and easier to control than the prior art wheelbarrow 10. If the wheelbarrow 50 becomes slightly off-level while transporting the load 72, a user may easily level the wheelbarrow without spilling the load due to the dramatically reduced height of the center of gravity 74. In addition, the frame 58 gives the user an increased mechanical advantage in lifting a load 72, allowing them to lift a heavier load more easily. The wheelbarrow 50 gives the user a mechanical advantage of about 4:1 (the ratio of the distance between the wheel axle and the center of gravity 74 to the distance between the wheel axle and the handles 62) while the prior art wheelbarrow 10 gives a mechanical advantage of about 3:1. The combination of the higher mechanical advantage and the lower center of gravity 74 of the wheelbarrow 50 makes it significantly easier for a person to lift and control the load in the wheelbarrow, reducing the risk of accidents and the risk of injury.

The wheelbarrow 50 may be used on ground which is not level without the risk of spilling the load 72 while loading as the center of gravity 74 is much closer to the ground than in prior art wheelbarrows, all but eliminating the chance of the wheelbarrow tipping over. The wheelbarrow 50 is also much easier to use with concrete, where a wheelbarrow is typically filled directly from the concrete truck chute, making the wheelbarrow 50 much easier to keep from falling over or sliding around due to the weight and the speed of concrete entering the wheelbarrow. The wheelbarrow 50 is much more stable than prior art wheelbarrows in nearly all modes of operation.

It is thus appreciated that placing the frame 58 directly on the ground when the wheelbarrow 50 is at rest provides significant advantages in terms of the stability and ease of use of the wheelbarrow. It will be appreciated that the same advantages may be achieved while using small pads of insignificant height or the like beneath the frame. As discussed, the wheelbarrow 50 may be provided with skid plates 60. The skid plates 60 are typically a plastic such as polyethylene. The skid plates make it less likely that the wheelbarrow damages a finished surface if used on the same, making the wheelbarrow more useful for many types of projects. Additionally, the skid plates 60 allow the user to slide the wheelbarrow 50 across some surfaces. In many instances, such as when working on landscaping projects, wheelbarrows must traverse stairs. The stairs are often railroad ties, stone, or concrete stairs. It is quite difficult to roll the wheelbarrow wheel up or down the stairs. The skid plates 60 allow the user to slide the wheelbarrow 50 down the stairs on the skid plates rather than on the wheel, making it easier to control the wheelbarrow and significantly reducing the risk of spilling the load 72.

As is shown, the frame 58 does not have any bar or member which extends across the front of the wheel 54, although a brace may extend across the upper portion of the wheel if desired. The lack of a bar or brace across the lower and front portion of the wheel makes it significantly easier to move and use the wheelbarrow 50 as the wheel 54 can more easily roll over uneven ground or objects such as curbs or rocks without striking the ground or the object with such a brace. As discussed, hitting a front brace (as in the prior art wheelbarrow 10) typically results in injury to the user's legs and/or the accidental spilling of the wheelbarrow load. Dumping the wheelbarrow 50 may be accomplished by simply dumping the load 72 over the side of the wheelbarrow by tilting the wheelbarrow, or by placing the wheel 54 against a rock or another appropriately sized object to provide some resistance against the continued rolling of the wheel 54.

Another advantage of the wheelbarrow 50 is that the bucket 66 rests against the frame 58 along the front of the bucket. This provides additional bracing for the bucket and results in a stronger frame, as the attachment to the bucket helps resist twisting or bending of the frame. The wheelbarrow 50 is stronger and expected to provide a longer service life than a conventional wheelbarrow.

Figure 3:
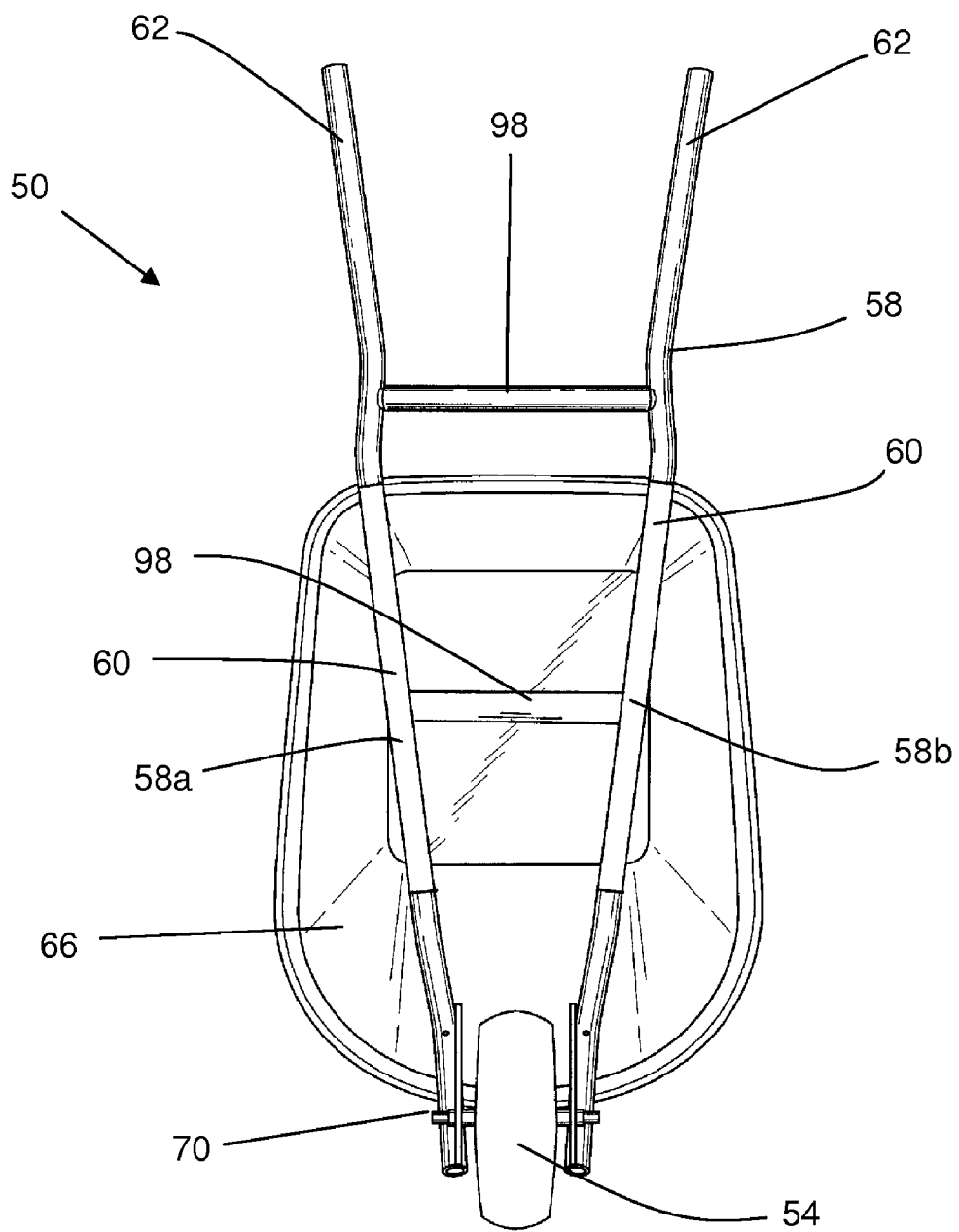
FIG. 3 shows a bottom view of the wheelbarrow of FIG. 2.
Figure 4:
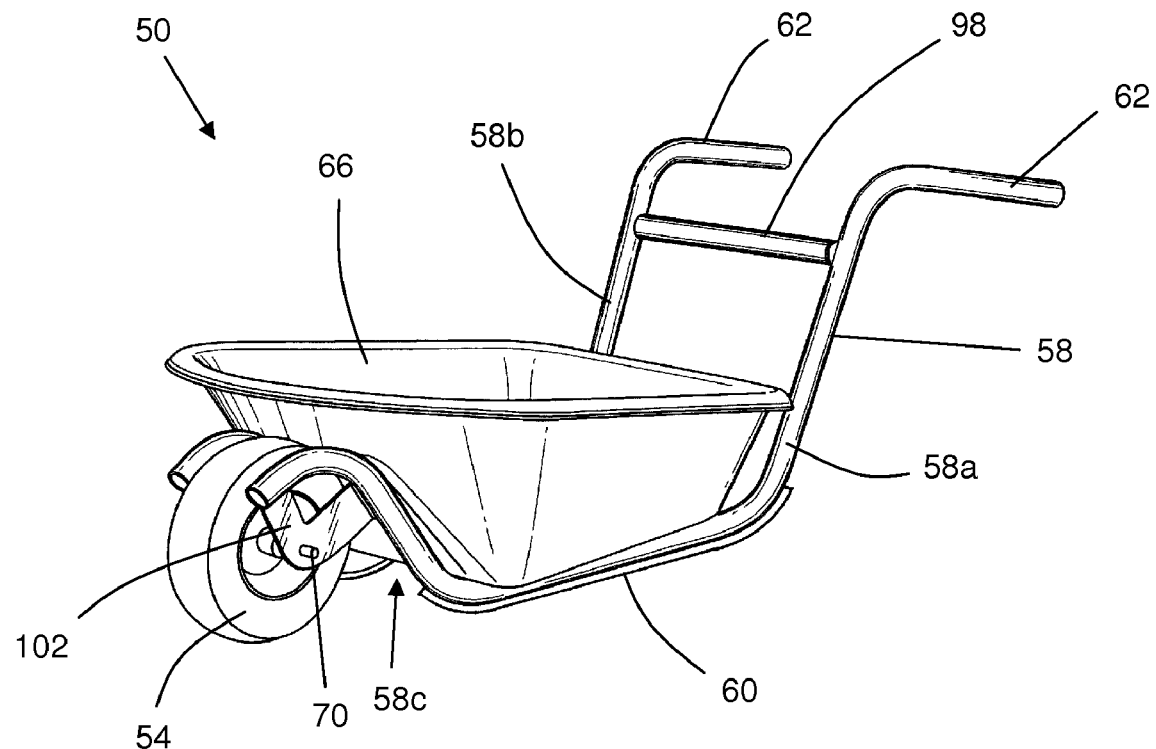
FIG. 4 shows a perspective view of the wheelbarrow of FIG. 2.

Turning now to FIG. 3, a bottom view of the wheelbarrow 50 is shown. The bottom view indicates how the frame 58 may include cross members 98 as are desired to brace the frame and adequately support the bucket 66. FIG. 4 shows a perspective view of the wheelbarrow 50, better illustrating the frame 58. It can be seen how the frame 58 extends along the front of the bucket 66 as indicated at 58c. The frame 58 then bends forwards so as to pass by the axle 70 and support the wheel 54. It is observed how the front and lower portion of the wheel 54 are not obstructed, making the wheelbarrow 50 easier to use as has been discussed. It is particularly desirable that there is no brace at or below the level of the axle 70, as it is not easy to roll over obstructions taller than the axle 70 regardless of the presence or lack of a brace. According to a preferred embodiment, the frame 58 extends along a significant amount of the front of the bucket 66 so as to adequately brace the bucket, placing the front of the frame above the axle 70 as discussed. The frame 58 is bent in a curve above the wheel 54 and side plates 102 are used to support the axle 70. Such a frame design is quite strong and helps to eliminate stress risers, providing a durable frame with a long service life.

Figure 5:
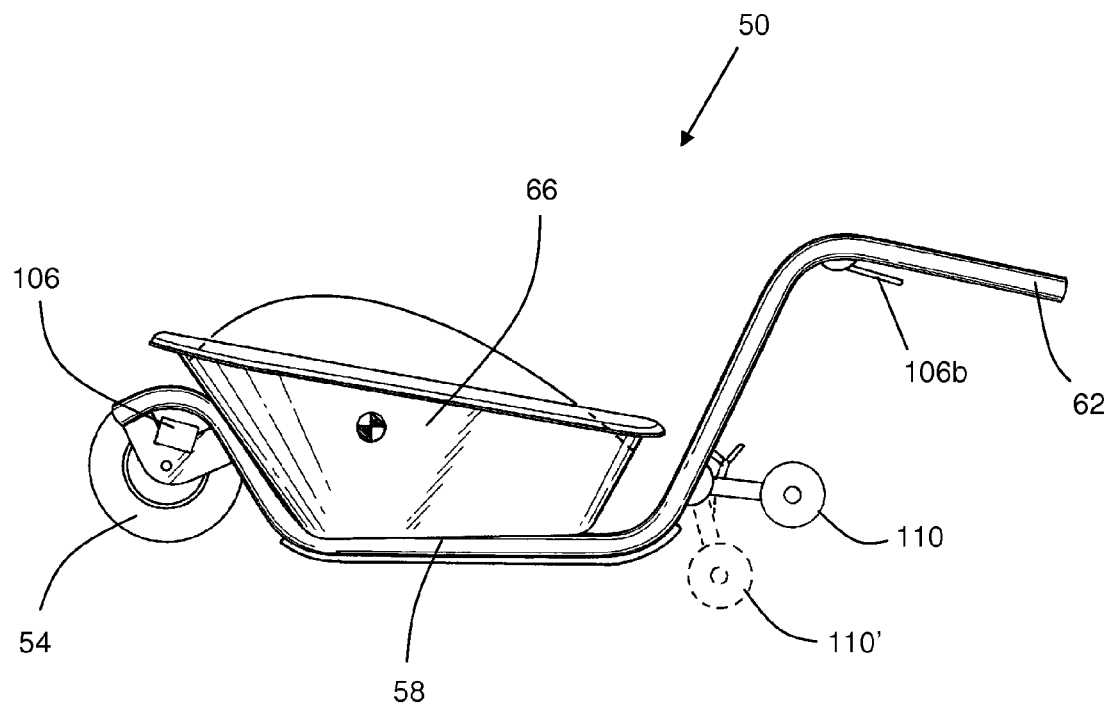
FIG. 5 shows another side view of the wheelbarrow of FIG. 2.

Turning now to FIG. 5, the wheelbarrow 50 is shown with additional features which make the wheelbarrow easier to use. If desired, the wheelbarrow 50 may be provided with a front wheel brake 106 and hand lever 106b or rear casters 110 as shown. The front wheel brake 106 can help a user stop or dump the wheelbarrow 50. The rear casters 110 can be locked down as indicated at 110' and further help prevent damage to finished surfaces. While these options are not necessary for many applications of the wheelbarrow 50, they can be useful in some situations. When the wheels are locked down, the wheelbarrow frame 58 will not rest on the ground, but the weight of the wheelbarrow 50 will be supported by the wheel 54 and casters 110 (typically two are included on the two sides of the frame). This allows a person to place and use the wheelbarrow on a finished surface such as tile without damaging the surface, and allows a person to more easily move the wheelbarrow short distances during use on such a surface.

Figure 6:
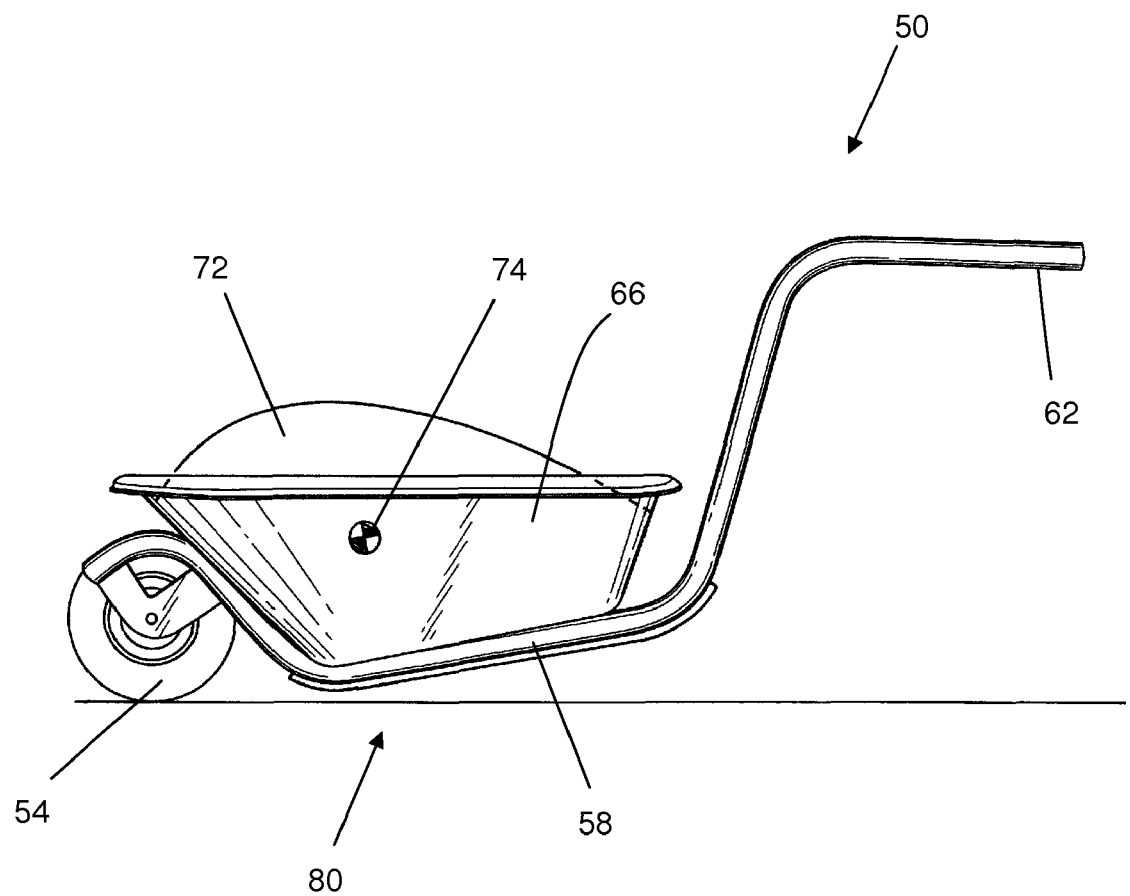
FIG. 6 shows another side view of the wheelbarrow of FIG. 2.

Turning now to FIG. 6 a side view of the wheelbarrow 50 is shown, illustrating the wheelbarrow in use. The handles 62, while sloping downwardly at rest, are approximately level when lifted for moving the wheelbarrow 50. This makes it easier and more comfortable for a person to control and maneuver the wheelbarrow 50. Even when the wheelbarrow 50 is lifted as shown during use, the load 72 and center of gravity 74 remain close to the ground, making the wheelbarrow easier to use and control, and reducing the risk of spilling the load.

There is thus disclosed an improved wheelbarrow. It will be appreciated that numerous changes may be made to the present invention without departing from the scope of the claims.

What is claimed is:

1. A wheelbarrow comprising:
a frame including rear handles to allow a person to move the wheelbarrow;
a bucket attached to the frame;
a wheel attached to the front of the frame; and
wherein the frame lacks any significant legs beneath the bucket such that the bucket is placed substantially at ground level when the wheelbarrow is at rest; wherein the frame extends horizontally beneath the bucket and rests on the ground when the wheelbarrow is at rest, and wherein the wheel is off of the ground when the wheelbarrow is at rest.

2. The wheelbarrow of claim 1, wherein the frame does not cross in front of the front wheel so as to leave the front of the wheel unobstructed.

3. The wheelbarrow of claim 1, wherein the handles are positioned at an angle to the ground so that, when the wheelbarrow frame is resting on the ground, the handles slope towards the ground as they extend outwardly from the wheelbarrow.

4. The wheelbarrow of claim 3, wherein the handles are level when the handles are lifted so as to lift the frame from the ground so as to move the wheelbarrow.

5. The wheelbarrow of claim 1, wherein the frame does not cross in front of or above the wheel so as to leave the wheel unobstructed.

6. The wheelbarrow of claim 1, wherein the wheelbarrow has a brake configured for selectively preventing rotation of the front wheel.

7. The wheelbarrow of claim 1, further comprising casters pivotably mounted to the frame near the back of the wheelbarrow bucket, and wherein the casters are selectively movable between a first upper position where the casters do not touch the ground and a second lower position where the casters support the weight of the wheelbarrow when in a resting position so that the frame does not touch the ground.

8. The wheelbarrow of claim 1, further comprising skid plates attached to the bottom of the frame such that the skid plates are between the frame and the ground.

9. The wheelbarrow of claim 1, wherein the frame extends below the bucket and generally along the bucket bottom to the lower front corner of the bucket and thereat bends upwardly so as to be adjacent the front of the bucket until approximately the height of the axle of the wheel and there extends outwardly from the bucket.

10. A wheelbarrow comprising:
a bucket configured for carrying a load;
a wheel disposed in front of the bucket;
a frame, the frame extending horizontally beneath the bucket and extending upwardly along the front of the bucket, the frame extending forwards from the bucket so as to attach to the wheel, the frame extending upwardly and rearwardly from the bucket so as to provide handles behind the bucket, and wherein the frame is configured such that the horizontal portion of the frame disposed beneath the bucket rests on the ground when the wheelbarrow is at rest on the ground, and
wherein the wheel is not in contact with the ground when the wheelbarrow is at rest on the ground.

11. The wheelbarrow of claim 10, wherein the frame is open and without a cross member along the front and bottom of the wheel.

12. The wheelbarrow of claim 10, wherein the frame comprises a first and a second side and wherein each side comprises, more specifically, a generally horizontal first portion beneath the bucket, a second portion extending upwardly and rearwardly from the rear of said first portion, a third portion extending downwardly and rearwardly from the rear of said second portion, said third portion forming a handle, a fourth portion extending upwardly and forwardly from the front of said first portion, said fourth portion forming a mount to which the wheel is attached.

13. The wheelbarrow of claim 12, wherein the fourth portion comprises a first section extending upwardly and forwardly along the surface of the bucket and a second section extending forwardly therefrom so as to extend away from the bucket and so as to provide a mounting location for said wheel.

14. The wheelbarrow of claim 10, wherein a portion of the frame follows the contour of the front of the bucket so as to contact the front of the bucket.

15. The wheelbarrow of claim 10, further comprising a skid plate attached to the bottom of the horizontal portion of the frame beneath the bucket, the skid plate being configured for sliding across surfaces in order to move the wheelbarrow.

16. The wheelbarrow of claim 10, wherein the frame does not cross in front of the wheel or above the wheel in front of a wheel axle so as to leave the wheel in front of the wheel axle unobstructed.

17. The wheelbarrow of claim 10, wherein the handles extend rearwardly and downwardly towards the ground when the wheelbarrow is at rest on the ground, and wherein the handles extend rearwardly and generally horizontally when the handles are lifted so as to lift the wheelbarrow for movement thereof.

18. A wheelbarrow comprising:
   a wheel;
   a bucket;
   a frame having a first side and a second side, each side comprising;
      a first generally curved section disposed adjacent the top of the wheel, the wheel being attached thereto between said first side and said second side via an axle and a bracket;
      a second section attached to the first section and extending downwardly along the surface of the front of the bucket;
      a third section attached to the second section and extending horizontally along the bottom of the bucket;
      a fourth section attached to the third section and extending upwardly and rearwardly behind the bucket; and
      a fifth section attached to the fourth section and extending rearwardly behind said fourth section, the fifth section forming a handle; and
   wherein the third section of the frame rests on the ground when the wheelbarrow is at rest on the ground, and
   wherein the wheel is up off of the ground when the wheelbarrow is at rest on the ground.

19. The wheelbarrow of claim 18, wherein the frame does not cross in front of the wheel or above the wheel so as to leave the front and top of the wheel unobstructed.

20. The wheelbarrow of claim 18, further comprising a skid plate attached to the bottom of the third section, the skid plate resting on the ground when the wheelbarrow is at rest on the ground.

21. The wheelbarrow of claim 18, wherein the fifth section extends rearwardly and downwardly when the wheelbarrow is at rest on the ground, and wherein the fifth section extends rearwardly and generally horizontally when the handles are lifted so as to lift the wheelbarrow and move the wheelbarrow.

* * * * *